US012117841B2

(12) United States Patent
Birger et al.

(10) Patent No.: US 12,117,841 B2
(45) Date of Patent: Oct. 15, 2024

(54) METHODS AND SYSTEMS FOR DETECTION OF AGRICULTURAL SPRAYING ERRORS

(71) Applicant: Agromentum Ltd., Yokne'am Illit (IL)

(72) Inventors: Iftach Birger, Yokne'am Illit (IL); Boaz Bachar, Fresno, CA (US); Tal Weksler, Yokne'am Illit (IL)

(73) Assignee: AGROMENTUM LTD., Yokne'am Illit (IL)

( * ) Notice: Subject to any disclaimer, the term of this patent is extended or adjusted under 35 U.S.C. 154(b) by 590 days.

(21) Appl. No.: 17/489,123

(22) Filed: Sep. 29, 2021

(65) Prior Publication Data
US 2022/0019231 A1 Jan. 20, 2022

Related U.S. Application Data

(63) Continuation of application No. PCT/US2020/025795, filed on Mar. 30, 2020.
(Continued)

(51) Int. Cl.
 *G05D 1/00* (2024.01)
 *A01M 7/00* (2006.01)
 *G01S 19/42* (2010.01)

(52) U.S. Cl.
 CPC ......... *G05D 1/0223* (2013.01); *A01M 7/0089* (2013.01); *G01S 19/42* (2013.01); *G05D 1/0219* (2013.01)

(58) Field of Classification Search
 CPC . G05D 1/0223; G05D 1/0219; A01M 7/0089; G01S 19/42; A01B 76/00
 See application file for complete search history.

(56) References Cited

U.S. PATENT DOCUMENTS 6,029,106 A    2/2000  Hale et al.
11,940,810 B2 * 3/2024  Birger ................. A01B 79/005
(Continued)

FOREIGN PATENT DOCUMENTS

WO    WO-2020205777 A1 * 10/2020  ............. A01B 76/00

OTHER PUBLICATIONS

Conesa-Munoz et al, J. Distributed Multi-Level Supervision to Effectively Monitor the Operations of a Fleet of Autonomous Vehicles in Agricultural Tasks, Google Scholar, Sensors 2015, pp. 5402-5428. (Year: 2015).*
(Continued)

*Primary Examiner* — Russell Frejd
(74) *Attorney, Agent, or Firm* — Greenberg Traurig

(57) ABSTRACT

A method includes receiving a location sample; determining whether the location sample is sufficient quality; if the location sample is not sufficient quality, discarding the current location sample; if the location sample is sufficient quality, determining whether the location sample is within a same row as a prior location sample; if the location sample is not within the same row as the prior location sample, discarding the location sample; if the location sample is within the same row as the prior location sample, assigning the location sample to the same row and generating an updated block map; determining whether the updated block map includes a potential skipped row; and issuing an alert if the potential skipped row remains a potential skipped row for an amount of time greater than a first threshold.

11 Claims, 7 Drawing Sheets

Related U.S. Application Data

(60) Provisional application No. 62/826,471, filed on Mar. 29, 2019.

(56) References Cited

U.S. PATENT DOCUMENTS

| | | |
|---|---|---|
| 2011/0238269 A1 | 9/2011 | Martin et al. |
| 2012/0073894 A1 | 3/2012 | Sprinkle et al. |
| 2012/0185138 A1 | 7/2012 | Prickel et al. |
| 2016/0169679 A1 | 6/2016 | Kajino et al. |

OTHER PUBLICATIONS

Pontikakos et al, C.M. Location-Aware System for Olive Fruit Fly Spray Control, Google Scholar, Elsevier, Computers and Electronics in Agriculture, 2010, pp. 355-368. (Year: 2010).*

Stentz et al., "A system for semi-autonomous tractor operations," In: Autonomous Robots (Jul. 2002), retrieved on Jul. 9, 2020 from <https://www.researchgate.net/profile/Carl_Wellington/publication/239932742_A_System_for_SemiAutonomous_Tractor_Operations/links/559de2af08aec72001828a7e.pdf> entire document.

\* cited by examiner

METHODS AND SYSTEMS FOR DETECTION OF AGRICULTURAL SPRAYING ERRORS

CROSS-REFERENCE TO RELATED APPLICATION

This application is a Continuation of International (PCT) Patent Application No. PCT/US2020/025795 filed Mar. 30, 2020, which relates to and claims the benefit of commonly-owned, U.S. Provisional Patent Application No. 62/826,471, filed Mar. 29, 2019, entitled "METHODS AND SYSTEMS FOR DETECTION OF AGRICULTURAL SPRAYING ERRORS," the contents of which are incorporated herein by reference in their entirety.

FIELD

The exemplary embodiments relate to methods and systems for detecting errors during the administration of materials (such as pesticides, herbicides, and/or fungicides) to agricultural crops.

BACKGROUND

Materials such as pesticides, herbicides, and fungicides are typically administered to crops (e.g., within orchards or vineyards) at night due to favorable weather conditions. Materials are also often administered by workers who are untrained and/or unmotivated. Consequently, errors often occur during administration.

SUMMARY OF THE INVENTION

In an embodiment, a method for detecting an activity of a tractor includes comparing a tractor speed to a stop threshold; if the tractor speed does not exceed the stop threshold, determining that the tractor is stationary; if the tractor speed exceeds the stop threshold, determining whether the tractor is within a block; if the tractor is not within the block, determining that the tractor is driving; if the tractor is within the block, determining whether the tractor speed exceeds an operation threshold; if the tractor speed exceeds the operation threshold, determining that the tractor is driving; if the tractor speed does not exceed the operation threshold, determining whether the tractor has a specific action sensor; if the tractor has a specific action sensor, detecting the activity based on the specific action sensor; if the tractor does not have a specific action sensor, determining whether the tractor has a further sensor; if the tractor has a further sensor, detecting the activity based on the further sensor; if the tractor does not have the further sensor, determining whether the tractor has an RFID tag; if the tractor has the RFID tag, determining the tractor activity based on a default activity for the RFID tag; if the tractor does not have the RFID tag, determining the tractor activity based on a default activity for the tractor.

In an embodiment, a method for detecting an error by a tractor includes determining whether the tractor is spraying; if the tractor is not spraying, determining that no error is occurring; if the tractor is spraying, determining whether the spraying is appropriate for a current weather condition; if the spraying is not appropriate for the current weather condition, issuing an alert; if the spraying is appropriate for the current weather conditions, determining whether a current speed of the tractor is within a speed guideline; if the current speed of the tractor is not within the speed guideline, issuing an alert; if the current speed of the tractor is within the speed guideline, determining whether a current flow rate of the tractor is within a flow rate guideline; if the current flow rate of the tractor is not within the flow rate guideline, issuing an alert; if the current flow rate of the tractor is within the flow rate guideline, determining whether a current location of the tractor is within a block; if the current location of the tractor is not within the block, issuing an alert.

In an embodiment, a method for detecting duplicate spraying and missed spraying includes determining whether a current location sample is of sufficient quality; if the current location sample is not of sufficient quality, discarding the current location sample; if the current location sample is of sufficient quality, determining whether the current location sample is within a same row as at least one prior location sample; if the current location sample is not within the same row as the at least one prior location sample, discarding the current location sample; if the current location sample is within the same row as the at least one prior location sample, assigning the current location sample to the same row and generating an updated block map; determining whether the updated block map includes a potential skipped row having sprayed rows to either side thereof; issuing an alert if the potential skipped row remains a potential skipped row for an amount of time greater than a first threshold; determining whether the updated block map includes potential adjacent skipped rows; issuing an alert if the potential adjacent skipped rows remain potential adjacent skipped rows for an amount of time greater than a second threshold; identifying duplicate spraying within a duplicate spraying row; and issuing an alert for the duplicate spraying.

In some embodiments, a method includes receiving a tractor speed of a tractor; comparing the tractor speed to a stop threshold speed; if the tractor speed does not exceed the stop threshold speed, determining that the tractor is stationary; if the tractor speed exceeds the stop threshold speed, determining whether the tractor is within a block; if the tractor is not within the block, determining that the tractor is driving; if the tractor is within the block, determining whether the tractor speed exceeds an operation threshold speed; if the tractor speed exceeds the operation threshold speed, determining that the tractor is driving; if the tractor speed does not exceed the operation threshold speed, determining whether the tractor has a specific action sensor; if the tractor has a specific action sensor, detecting an activity of the tractor based on the specific action sensor; if the tractor does not have a specific action sensor, determining whether the tractor has a further sensor; if the tractor has the further sensor, detecting the activity of the tractor based on the further sensor; if the tractor does not have the further sensor, determining whether the tractor has an RFID tag; if the tractor has the RFID tag, determining the tractor activity based on a default activity of the RFID tag; and if the tractor does not have the RFID tag, determining the tractor activity based on a default activity for the tractor.

In some embodiments, a method includes determining whether a tractor is spraying; if the tractor is not spraying, determining that no spraying error is occurring; if the tractor is spraying, determining whether the spraying is appropriate for a current weather condition; if the spraying is not appropriate for the current weather condition, issuing an alert; if the spraying is appropriate for the current weather conditions, determining whether a current speed of the tractor is within a speed guideline; if the current speed of the tractor is not within the speed guideline, issuing an alert; if the current speed of the tractor is within the speed guideline, determining whether a current flow rate of the tractor is within a flow rate guideline; if the current flow rate of the tractor is not within the flow rate guideline, issuing an alert; if the current flow rate of the tractor is within the flow rate guideline, determining whether a current location of the tractor is within a block; and if the current location of the tractor is not within the block, issuing an alert.

In some embodiments, the step of determining whether the tractor is spraying is performed by a method including steps of: receiving a tractor speed of the tractor; comparing the tractor speed to a stop threshold speed; if the tractor speed does not exceed the stop threshold speed, determining that the tractor is stationary; if the tractor speed exceeds the stop threshold speed, determining whether the tractor is within a block; if the tractor is not within the block, determining that the tractor is driving; if the tractor is within the block, determining whether the tractor speed exceeds an operation threshold speed; if the tractor speed exceeds the operation threshold speed, determining that the tractor is driving; if the tractor speed does not exceed the operation threshold speed, determining whether the tractor has a specific action sensor; if the tractor has a specific action sensor, detecting an activity of the tractor based on the specific action sensor; if the tractor does not have a specific action sensor, determining whether the tractor has a further sensor; if the tractor has the further sensor, detecting the activity of the tractor based on the further sensor; if the tractor does not have the further sensor, determining whether the tractor has an RFID tag; if the tractor has the RFID tag, determining the tractor activity based on a default activity of the RFID tag; and if the tractor does not have the RFID tag, determining the tractor activity based on a default activity for the tractor.

In some embodiments, a method includes receiving a current location sample; determining whether the current location sample is of sufficient quality; if the current location sample is not of sufficient quality, discarding the current location sample; if the current location sample is of sufficient quality, determining whether the current location sample is within a same row as at least one prior location sample; if the current location sample is not within the same row as the at least one prior location sample, discarding the current location sample; if the current location sample is within the same row as the at least one prior location sample, assigning the current location sample to the same row and generating an updated block map; determining whether the updated block map includes a potential skipped row; issuing an alert if the potential skipped row remains a potential skipped row for an amount of time greater than a first threshold; determining whether the updated block map includes potential adjacent skipped rows; issuing an alert if the potential adjacent skipped rows remain potential adjacent skipped rows for an amount of time greater than a second threshold; identifying duplicate spraying within a duplicate spraying row; and issuing an alert for the duplicate spraying.

In some embodiments, the step of determining whether the current location sample is of sufficient quality comprises comparing a current location sample accuracy to a threshold accuracy, wherein the current location sample is determined to be of sufficient quality if the current location sample accuracy is better than the threshold accuracy, and wherein the current location sample is determined not to be of sufficient quality if the current location sample accuracy is worse than the threshold accuracy. In some embodiments, the current location sample accuracy is received from a global navigation satellite system receiver. In some embodiments, the threshold accuracy is three meters. In some embodiments, a potential skipped row is a row that has not been sprayed and that has rows that have been sprayed to either side thereof. In some embodiments, the first threshold is one hour. In some embodiments, the second threshold is between six hours and eighteen hours. In some embodiments, a duplicate spraying row is a row that has been sprayed by more than one tractor.

DETAILED DESCRIPTION

Figure 1:
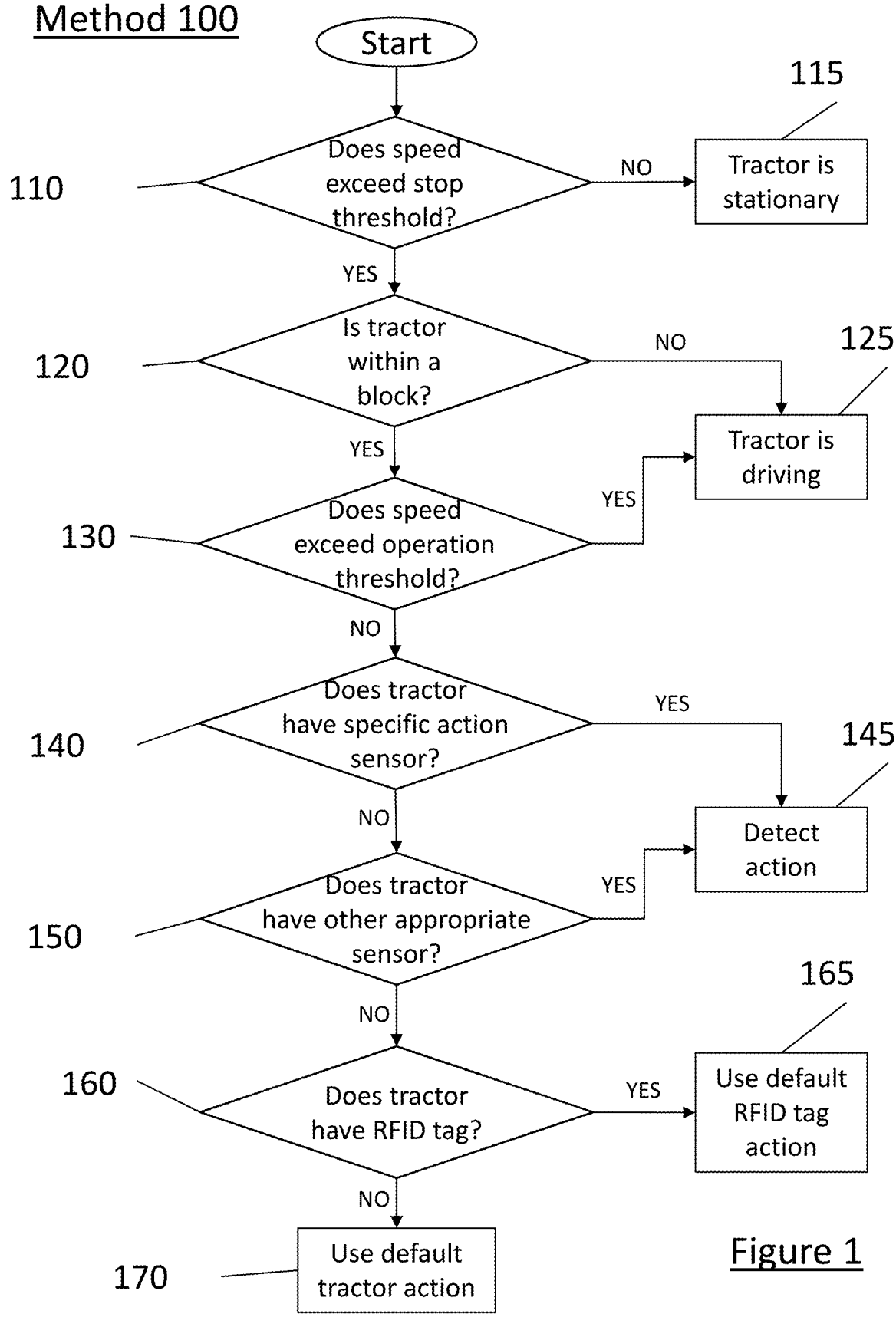
FIG. 1 shows an exemplary method for detecting the current operations of a tractor.

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

Current practices for cultivating crops in orchards or vineyards involve spraying trees or vines with products such as pesticides, herbicides, or fungicides (collectively "products") to protect crops against differing types of damage. Typically, materials are sprayed through the use of equipment that is mounted to tractors as the tractors drive through an orchard or vineyard.

Spraying operations are defined by three main parameter types. The first parameter is chemical. Chemical parameters include the nature of the material or mix of materials is to be sprayed, as well as whether the material or mix of materials is correct for the pest or disease to be treated. The second parameter type is biological. Biological parameters include spraying the correct material for the pest or disease to be treated. Biological parameters also include refraining from using active ingredients that have been used to too great an extent, leading to resistance in pests.

The third parameter type is physical. Physical parameters include tractor speed, as a tractor that is traveling at too fast a speed will result in sprayed materials not reaching the entire canopy. Physical parameters also include interrelated values of pressure and administration rate (e.g., gallons per acre) to be sprayed. If too low pressure is used, trees will not fully be covered; if too high an administration rate is used, products will drift beyond the target area, and excessive costs will be incurred due to the use of unnecessary amounts of material. Additionally, physical parameters include weather, as materials cannot effectively be sprayed in hot weather, low humidity, or high wind.

Spraying operations (alternatively referred to herein as "tasks") typically take place at night due to better weather conditions, and also often involve operations being handled by inexperienced or unmotivated workers. As a result, errors often occur in spraying operations. Errors may include errors in parameters noted above (for example, driving a tractor at too fast a speed) or in other manners, such as spraying in the wrong block, double-spraying a row of trees or vines, or skipping a row of trees or vines. However, one technological problem is that existing techniques for monitoring of spraying activities during such conditions do not provide for issuance of real-time alerts of incorrect spraying behavior or for automatic detection of rows that have been sprayed an incorrect number of times. The exemplary embodiments provide a technological solution based at least in part on the use of sensed tractor data in connection with row-level block maps to provide methods and systems for monitoring tasks to detect errors and issue corresponding alerts.

In some embodiments, error detection includes the use of an action detection algorithm. In some embodiments, action detection takes place through the use of sensors that are located on a tractor (e.g., integral within a tractor; part of an external device that is installed on a tractor). In some embodiments, sensors include a Global Navigation Satellite System ("GNSS") receiver, which is in communication with a constellation of satellites and which is capable of determining the location, speed, and heading of a tractor in accordance with known techniques. A GNSS may be, for example, the Global Positioning System ("GPS") operated by the United States, the Globalnaya Navigatsionnaya Sputnikovaya Sistema ("GLONASS") operated by Russia, the BeiDou Navigation Satellite System operated by China, the Galileo system operated by the European Union, or another comparable system. In some embodiments, sensors are also capable of reading data from a tractor's engine.

Although some tractors include a spraying on/off switch in their cabins, it is not always possible for sensors to tell whether a tractor is spraying based on this switch. Moreover, in some cases, spraying on/off switches are left in an "on" position even while spraying is not ongoing, such as when no spraying equipment is connected to a tractor. Consequently, in the exemplary embodiments, an action detection algorithm involves determining whether a tractor is spraying without reference to a cabin-located spraying on/off switch. FIG. 1 shows a flowchart of a method 100 for the exemplary technological solution of detecting a tractor's actions. In some embodiments, the method 100 is repeated on an ongoing basis (for example, every second, every two seconds, every three seconds, etc.) at all times when a tractor is operating. In some embodiments, the method 100 is implemented through the use of computer-executable instructions embodied in a medium and executed by appropriate computer hardware.

In step 110, the speed of the tractor is determined and compared to a threshold. In some embodiments, the speed is determined based on GNSS data. In some embodiments, the speed is determined based on the tractor's engine and related equipment (e.g., speedometer). In some embodiments, the threshold is 0.5 kilometers per hour. If the tractor's speed is less than the threshold, then the method 100 concludes in step 115 with a determination that the tractor is stationary. If the tractor's speed is greater than the threshold, then the method continues to step 120.

In step 120, the location of the tractor is determined and compared to one or more block maps to determine whether the tractor is within a block. In some embodiments, the block maps are those generated by the mapping method 500 described with reference to FIG. 5. In some embodiments, the location is determined based on GNSS data. If it is determined that the tractor is not within a block (for example, located externally to a block; located on a road that extends around a block; located on a road or path within a block), then the method concludes in step 125 with a determination that the tractor is driving (i.e., not spraying). If it is determined in step 120 that the tractor is within a block, then the method continues to step 130.

In step 130, the speed of the tractor is compared to an operation speed (e.g., a maximum speed for spraying operations). In some embodiments, the speed previously determined in step 110 is again used in step 130. In some embodiments, the speed is freshly determined (such as based on GNSS data or the tractor's internal equipment, as described above with reference to step 110). In some embodiments, the operation speed is operation-specific (e.g., based on the specific material that a tractor is to be administering). In some embodiments, the operation speed is block-specific (e.g., based on the topography or crop in a specific block). In some embodiments, the operation speed is based on historical data (e.g., the usual recommended speed for a given tractor). In some embodiments, the operation speed is a predetermined value (e.g., 20 kilometers per hour). In some embodiments, if the speed is greater than the operation speed, then the method concludes in step 125 with a determination that the tractor is driving (i.e., not spraying). If it is determined in step 130 that the tractor is not exceeding operation speed, then the method continues to step 140.

In step 140, the method determines whether the tractor has an action sensor. In some embodiments, the action sensor is a sensor that is capable of assessing the state of a tractor's spraying hardware to determine the tractor's action (e.g., whether the tractor is presently spraying). In some embodiments, the action sensor is a flowmeter. If it is determined in step 140 that the tractor has an action sensor, then the method proceeds to step 145, in which the output of the action sensor is evaluated to detect the action of a tractor (e.g., if the action sensor is a flowmeter, then the traction is determined to be spraying if the flow rate detected by the flowmeter exceeds a threshold value). If it is determined in step 140 that the tractor does not have an action sensor, then the method continues to step 150.

In step 150, the method determines whether the tractor has another sensor from which its action can be derived. For example, the other sensor might be a sensor that is primarily used for another type of action. In some embodiments, the other type of sensor is an electric valve. In some embodiments, the other type of sensor is a power take-off ("PTO") sensor. If it is determined in step 150 that the tractor has another suitable sensor, then the method proceeds to step 155, in which the output of the sensor is evaluated to detect the action of a tractor. If it is determined in step 150 that the tractor does not have an action sensor, then the method continues to step 160.

In step 160, the method determines whether the tractor has an RF tag associated with its equipment. In some embodiments, such an RF tag will store data indicating the planned activity for a tractor, and can be interrogated using standard techniques to obtain this data. If it is determined in step 160 that the tractor has an RF tag sensor, then the method proceeds to step 165, in which the action of the tractor is assumed to be the default action corresponding to the RF tag. If it is determined in step 160 that the tractor does not have an RF tag, then the method continues to step 170.

It will be apparent to those of skill in the art that, while the method 100 is described herein with specific reference to the use of an RF tag to identify activities, the same concept is equally applicable to any other type of beacon capable of storing activity information and being interrogated to provide such information. For example, rather than an RF tag, a suitable beacon could include an RF sensor, a Bluetooth beacon (or other device operating through the use of Bluetooth), a Bluetooth low energy ("BLE") beacon, or any other similar device.

In step 170, if the determination of a tractor's action cannot be made based on any of the above, then the tractor's action is assumed to be the tractor's default action, which may be known on a per-tractor basis. In cases where a farm has RF identification capabilities (i.e., tractors engaged in spraying activities may be identified based on an RF tag as discussed above with reference to step 160), the default action for tractors may be set to "working". In cases where a farm does not have RF identification capabilities (i.e., tractor activities cannot be identified based on an RF tag as described above with reference to step 160), the default activity can be set to spraying or other activities as needed (for example, may be set to "spraying" during times of day when spraying activities are planned). Following step 170, the method 100 has been completed for a given sample. However, as noted above, the method 100 may be repeated on an ongoing basis while a tractor is operating.

Typically, tractors that are engaged in spraying operations within a block are operated in accordance with a set of operational parameters (e.g., recommended speed within the block, materials to spray within the block, product information such as application temperature, spraying volume, etc.), which are referred to herein as a "recommendation". The recommendation is determined by the grower who controls the block, but is not always provided as an input for an error detection method. The exemplary spraying error detection algorithm described herein may be applicable either in cases where a recommendation is provided or in cases where no recommendation is provided.

Figure 2:
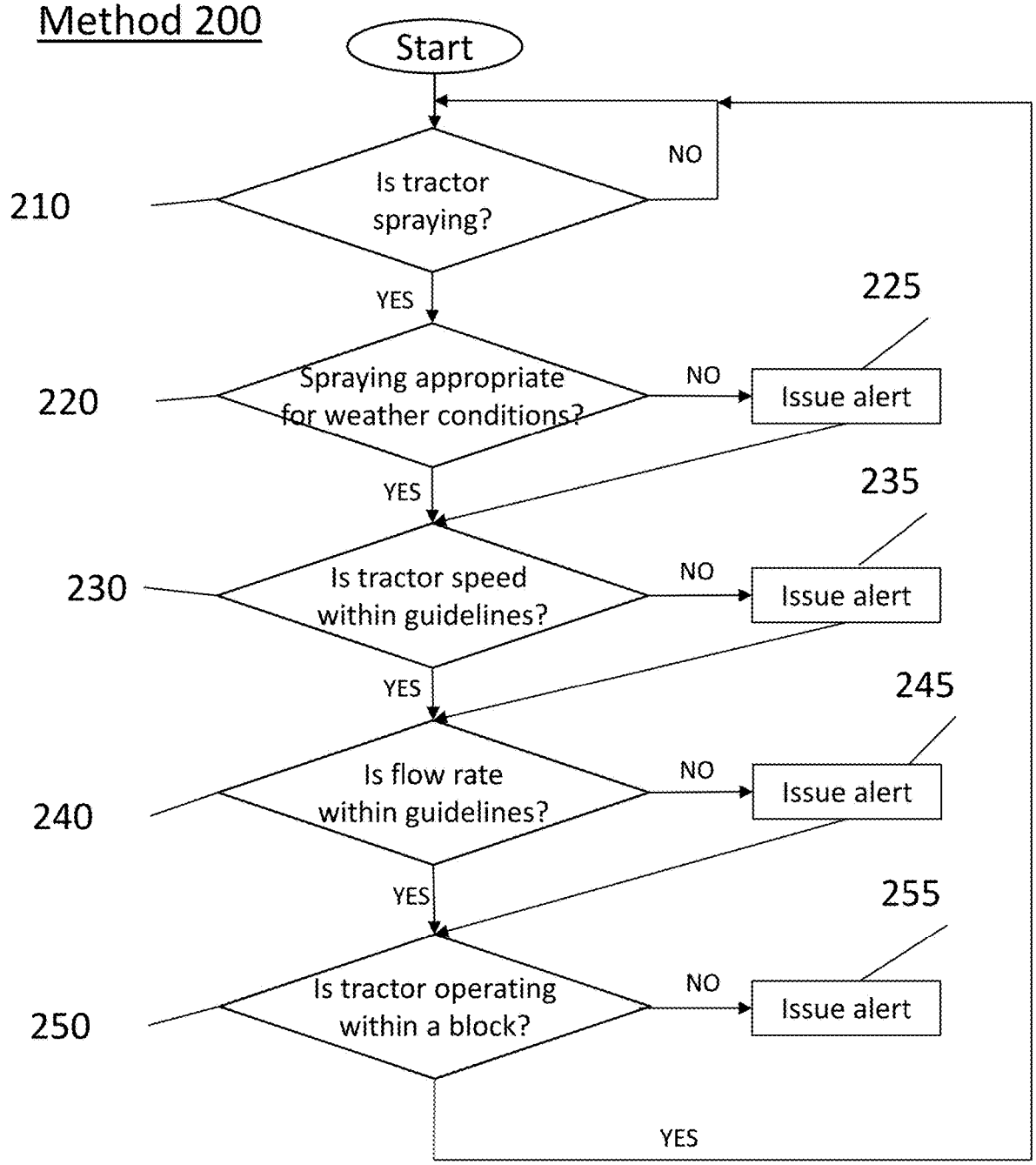
FIG. 2 shows an exemplary method for detecting spraying errors in real time.

FIG. 2 shows a flowchart of an exemplary method 200 for the exemplary technological solution of detecting spraying errors by a tractor on an ongoing basis. The method 200 uses as input (1) a block map, such as determined by the method 500 described with reference to FIG. 5, (2) the row span between rows of trees within the block, (3) GNSS data for the tractor being monitored, (4) the current flow rate being sprayed (if available), (5) current weather conditions (e.g., temperature, wind, humidity, etc.), (6) the type of crop planted within the block, (7) the year the crop was planted in the block, (8) the size of the trees and canopy within the block, (9) the recommendation, if available, and (10) the current activity of the tractor, such as determined by the method 100 described above with reference to FIG. 1. In some embodiments, the method 200 is performed on an ongoing basis (e.g., executed every second, every two seconds, every three seconds, etc.) in order to detect errors in real time.

In step 210, as a technological solution, the tractor activity is evaluated to determine whether spraying is currently taking place. If the tractor is not spraying (e.g., is stopped or driving), then no further action is called for, and the method returns to step 210 (e.g., for step 210 to be repeated at periodic intervals). If the tractor is spraying, then the method continues to step 220.

In step 220, as another technological solution, the current spraying activity is compared to current weather conditions to determine whether spraying is being performed in an inappropriate manner. In some embodiments, the weather conditions include wind speed. In some embodiments, current wind speed is compared to a best practice wind speed (e.g., a default maximum wind speed for the material being administered) to determine whether the material is being administered at too high a wind speed. In some embodiments, the default maximum wind speed is 30 kilometers per hour. In some embodiments, the default maximum wind speed is in the range between 20 kilometers per hour and 40 kilometers per hour. In some embodiments in which a recommendation is provided, current wind speed is compared to a maximum wind speed in the recommendation to determine whether the material is being administered at too high a wind speed. In some embodiments, the weather conditions include humidity. In some embodiments, current humidity is compared to a best practice humidity (e.g., a default minimum humidity for the material being administered) to determine whether the material is being administered at too low a humidity. In some embodiments, the default minimum humidity is thirty percent. In some embodiments, the default minimum humidity is in the range between twenty percent and forty percent. In some embodiments in which a recommendation is provided, current humidity is compared to a minimum humidity in the recommendation to determine whether the material is being administered at too low a humidity. In some embodiments, the weather conditions include temperature. In some embodiments, current temperature is compared to a best practice temperature (e.g., a default maximum temperature for the material being administered) to determine whether the material is being administered at too high a temperature.

In some embodiments, the default maximum temperature is thirty degrees Celsius. In some embodiments, the default temperature is in the range between twenty-five and thirty-five degrees Celsius. In some embodiments in which a recommendation is provided, current temperature is compared to a maximum temperature in the recommendation to determine whether the material is being administered at too high a temperature. In some embodiments, the weather conditions include more than one of wind speed, humidity, and temperature (e.g., two or all three of these parameters). If the current weather conditions are not in accordance either with best practice or recommendations (e.g., the wind speed is too high, the humidity is too low, and/or the temperature is too high), then the method continues to step 225.

In step 225, as another technological solution, an alert is issued to alert a relevant entity to administration not in keeping with weather guidelines. In some embodiments, the alert is provided to a grower (e.g., an individual who is operating or monitoring a farm including the block being monitored). In some embodiments, the alert is provided to an individual who is operating the tractor being monitored. In some embodiments, the alert is provided as an instruction to an autonomously operated tractor. Following step 225, the method continues to step 230.

Referring back to step 220, if the current weather conditions are found to be in accordance with best practice and/or recommendations, then the method proceeds from step 220 to step 230. In step 230, as another technological solution, the tractor's driving speed is compared to a speed guideline. In embodiments in which a recommendation has been provided, the speed guideline in the recommendation is used. In some embodiments, at least one range calculated based on the speed guideline is used. In some embodiments, a "low speed" range is between 70% and 90% of the speed guideline, with speeds less than 70% of the speed guideline presumed not to correspond to spraying activities and speeds greater than 90% of the speed guideline being sufficiently fast not to be considered "low speed". In some embodiments, a "high speed" range is between 110% and 130% of the speed guideline, with speeds greater than 130% of the speed guideline presumed not to correspond to spraying activities (i.e., the tractor is likely driving rather than spraying) and speeds less than 110% of the speed guideline being sufficiently slow not to be considered "high speed." Thus, for example, if the guideline speed is 3 kilometers per hour, then "low speed" alerts would be triggered based on speeds of between 2.1 and 2.7 kilometers per hour and "high speed" alerts would be triggered based on speeds of between 3.3 and 3.9 kilometers per hour. In embodiments in which no recommendation has been provided, an average speed of other tractors operating within the same block is calculated and the average speed of other tractors is used as the guideline speed. It will be apparent to those of skill in the art that use of the average speed of other tractors as a guideline speed is only a practical solution if there are at least two other tractors (i.e., three total tractors) operating in a block in a given time; accordingly, in embodiments in which no recommendation has been provided and there are not at least three total tractors operating in a block at a given time, step 230 is skipped and the method proceeds directly from step 220 to step 240. If the current speed is not in accordance with the speed guideline, then the method continues to step 235.

In step 235, as another technological solution, an alert is issued to alert a relevant entity to administration not in keeping with speed guidelines. In some embodiments, the alert is provided to a grower (e.g., an individual who is operating or monitoring a farm including the block being monitored). In some embodiments, the alert is provided to an individual who is operating the tractor being monitored. In some embodiments, the alert is provided as an instruction to an autonomously operated tractor. Following step 235, the method continues to step 240.

Referring back to step 230, if the current speed is found to be in accordance with guidelines, then the method proceeds from step 230 to step 240. In step 240, as another technological solution, the spraying flow rate (e.g., in gallons per acre) is compared to guidelines. In some embodiments, flow rate is received from sensors mounted on the tractor (e.g., a flowmeter). In some cases, a tractor does not have a flowmeter; in some embodiments of the method 200 performed in relation to such tractors, step 240 is skipped and the method proceeds directly from step 230 to step 250. In embodiments in which a recommendation has been provided, the flow rate guideline in the recommendation is used. In some embodiments, the current flow rate is considered to meet the guideline if it is within an acceptable range around the guideline. In some embodiments, the range is plus or minus twenty percent. In some embodiments, the range can be configured by an administrator, such as a farm operator. In embodiments in which no recommendation has been provided, an average flow rate of other tractors operating within the same block is calculated and the average flow rate of other tractors is used as the guideline flow rate. It will be apparent to those of skill in the art that use of the average flow rate of other tractors as a guideline flow rate is only a practical solution if there are at least two other tractors (i.e., three total tractors) operating in a block in a given time; accordingly, in embodiments in which no recommendation has been provided and there are not at least three total tractors operating in a block at a given time, step 240 is skipped and the method proceeds directly from step 230 to step 250. If the current flow rate is not in accordance with the flow rate guideline, then the method continues to step 245.

In step 245, as another technological solution, an alert is issued to alert a relevant entity to administration not in keeping with flow rate guidelines. In some embodiments, the alert is provided to a grower (e.g., an individual who is operating or monitoring a farm including the block being monitored). In some embodiments, the alert is provided to an individual who is operating the tractor being monitored. In some embodiments, the alert is provided as an instruction to an autonomously operated tractor. Following step 245, the method continues to step 250.

Referring back to step 240, if the current flow rate is found to be in accordance with guidelines, then the method proceeds from step 240 to step 250. In step 250, as another technological solution, the activity of the tractor is evaluated to determine whether the tractor is operating in the correct block. In this step, the location of the tractor (e.g., determined using GNSS data) is compared to the boundaries of blocks that have received recommendations. If the tractor is in a block that has not received a recommendation, then the method proceeds to step 255, in which, as another technological solution, an alert is issued to alert a relevant entity to spraying in an incorrect block. If the tractor is within a block that has received a recommendation, then the method returns to step 210 so that ongoing monitoring can continue. It will be apparent to those of skill in the art that steps 250 and 255 may be omitted in cases where no recommendations have been provided by a grower, in which case the method would proceed from step 240 directly back to step 210.

Figure 3:
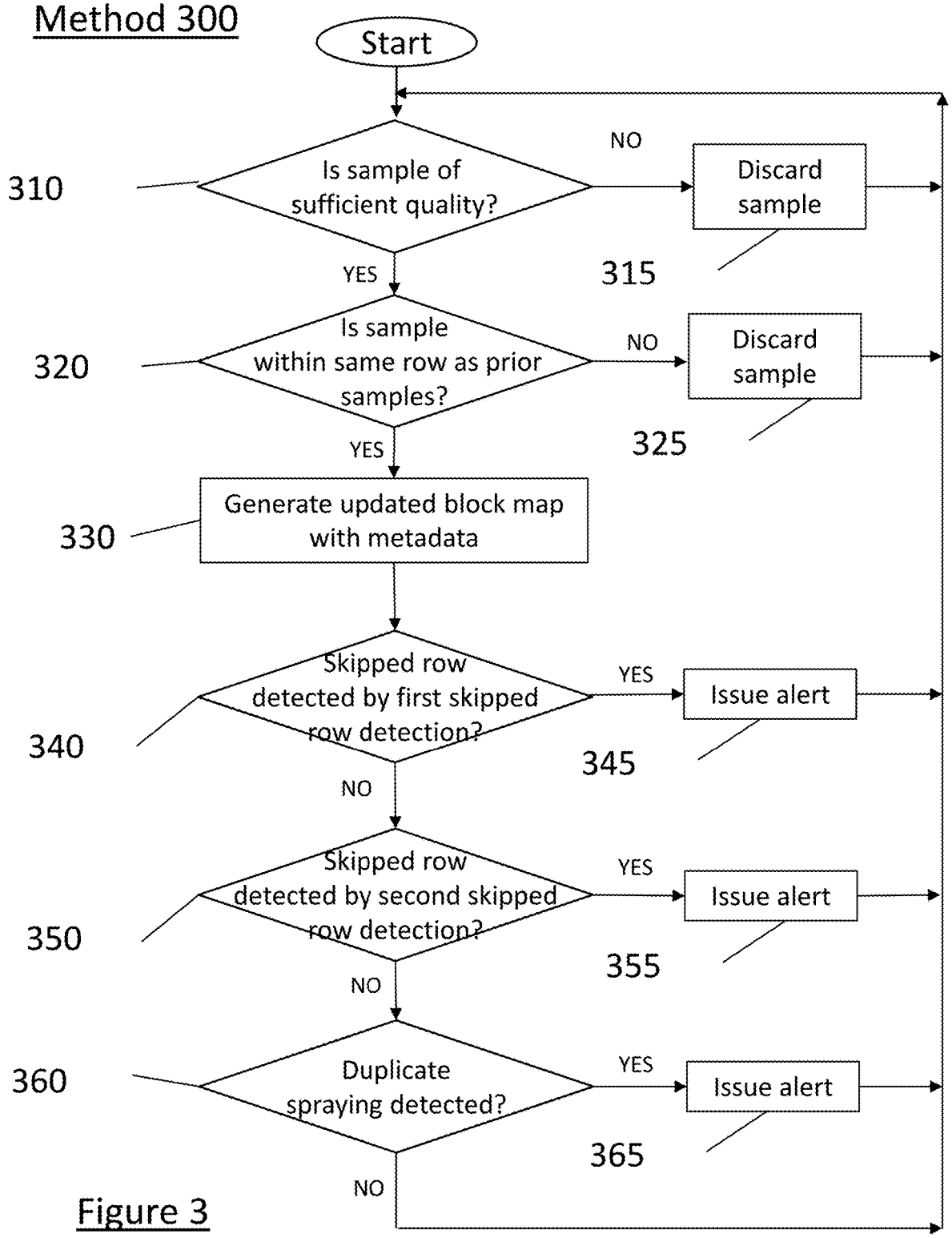
FIG. 3 shows an exemplary method for detecting skipped rows and rows that have been sprayed more than once.

FIG. 3 shows a flowchart of a method 300 for the exemplary technological solution of detecting rows that have been skipped or duplicatively sprayed during spraying operations within a block. The method 300 uses as input (1) a block map, such as determined by the method 500 described with reference to FIG. 5, and (2) GNSS data for each of one or more tractors operating within the block. The method 300, like the method 200, may operate continuously while spraying operations are ongoing.

In step 310, as a technological solution, a current sample is received and evaluated to determine whether its accuracy is of sufficient quality for use. Typical accuracy for GNSS location is within two meters, which is sufficient for use as row gap is typically around five meters. However, GNSS location data can be unreliable under tree cover, and can often be on the order of ten meters, which is insufficient for use as the sample might be located within a different row. Therefore, the accuracy of a current reading is compared to a threshold value. In some embodiments, the threshold value is three meters. If the accuracy is worse than the threshold value, then the method proceeds to step 315, in which, as another technological solution, the current sample is discarded. After step 315, the method returns to step 310 to evaluate a next sample. If the accuracy is better than the threshold value, the method proceeds to step 320.

In step 320, as another technological solution, the sample is compared to the block map to find the row within the block map that is nearest to the latitude/longitude of the sample. Next, the sample is compared to prior samples from the same tractor to determine whether the current sample is within the same row as prior samples. If it is determined that the current sample is not within the same row as prior samples, then the method continues to step 325, in which, as another technological solution, the current sample is discarded. After step 325, the method returns to step 310 to evaluate a next sample. If it is determined that the current sample is within the same row as prior samples, then it is assigned to that row and the method continues to step 330.

In step 330, as another technological solution, an updated version of the block map is generated in which each row is marked with the tractors that sprayed within the row. In particular, for each row within the block, in step 330 the system calculates the percentage of the row that each tractor has sprayed. For each row, metadata is generated in this step. In some embodiments, the metadata includes the identities of the tractors that drove through the row. In some embodiments, the metadata includes the coverage percentage of each tractor that drove through the row (in some cases, a tractor may only have driven over a portion of a row).

In step 340, as another technological solution, a first skipped row detection step takes place. In the first skipped row detection step, a row that has not been sprayed (i.e., the updated block map generated in step 330 indicates that no tractors have sprayed a given row) is compared to the adjacent rows to either side. If the adjacent rows have both been sprayed, the row that has not been sprayed is considered a candidate row possibly not to have been sprayed. The candidate row is then considered over a predetermined time period to evaluate whether it continues to be the case over the predetermined time period that the candidate row has not been sprayed. In some embodiments, the time period is one hour. If the time period elapses and the candidate row still has not been sprayed, then the candidate row is considered to be a skipped row and the method continues to step 345, in which, as another technological solution, an alert is issued (e.g., to a grower, to a tractor operator, etc.). If this is not the case, the method continues to step 350. It will be apparent to those of skill in the art that more than one row at a time within a field may be considered as a candidate row in the first skipped row detection step.

In step 350, as another technological solution, a second skipped row detection step takes place. In the second skipped row detection step, more than adjacent row that has not been sprayed (i.e., rows that do not meet the test of step 340) during spraying within a block are deemed to be candidate rows not to have been sprayed. The candidate rows are then considered over a predetermined time period to evaluate whether it continues to be the case over the predetermined time period that the candidate rows have not been sprayed. In some embodiments, the time period is between 6 hours and 18 hours. In some embodiments, the time period is between 8 hours and 16 hours. In some embodiments, the time period is between 10 hours and 14 hours. In some embodiments, the time period is between 11 hours and 13 hours. In some embodiments, the time period is about 12 hours. In some embodiments, the time period is 12 hours. If the time period elapses and the candidate rows have still not been sprayed, then the candidate rows are considered to be skipped rows and the method continues to step 355, in which an alert is issued (e.g., to a grower, to a tractor operator, etc.). If this is not the case, the method continues to step 360. It will be apparent to those of skill in the art that more than one group of adjacent rows at a time within a field may be considered as candidate rows in the second skipped row detection step.

In step 360, as another technological solution, rows that have been detected in step 330 to have been sprayed by more than one tractor are analyzed to evaluate which tractor is responsible for the duplication of spraying. In some embodiments, identification of the responsible tractor is performed by identifying which tractor has deviated from an assigned pattern (e.g., every row, every other row, etc.). Following this determination, in step 365 an alert is issued (e.g., to a grower, to a tractor operator, etc.). Following step 365, the method returns to step 310 for consideration of subsequent samples.

Block Mapping Process

Figure 4:
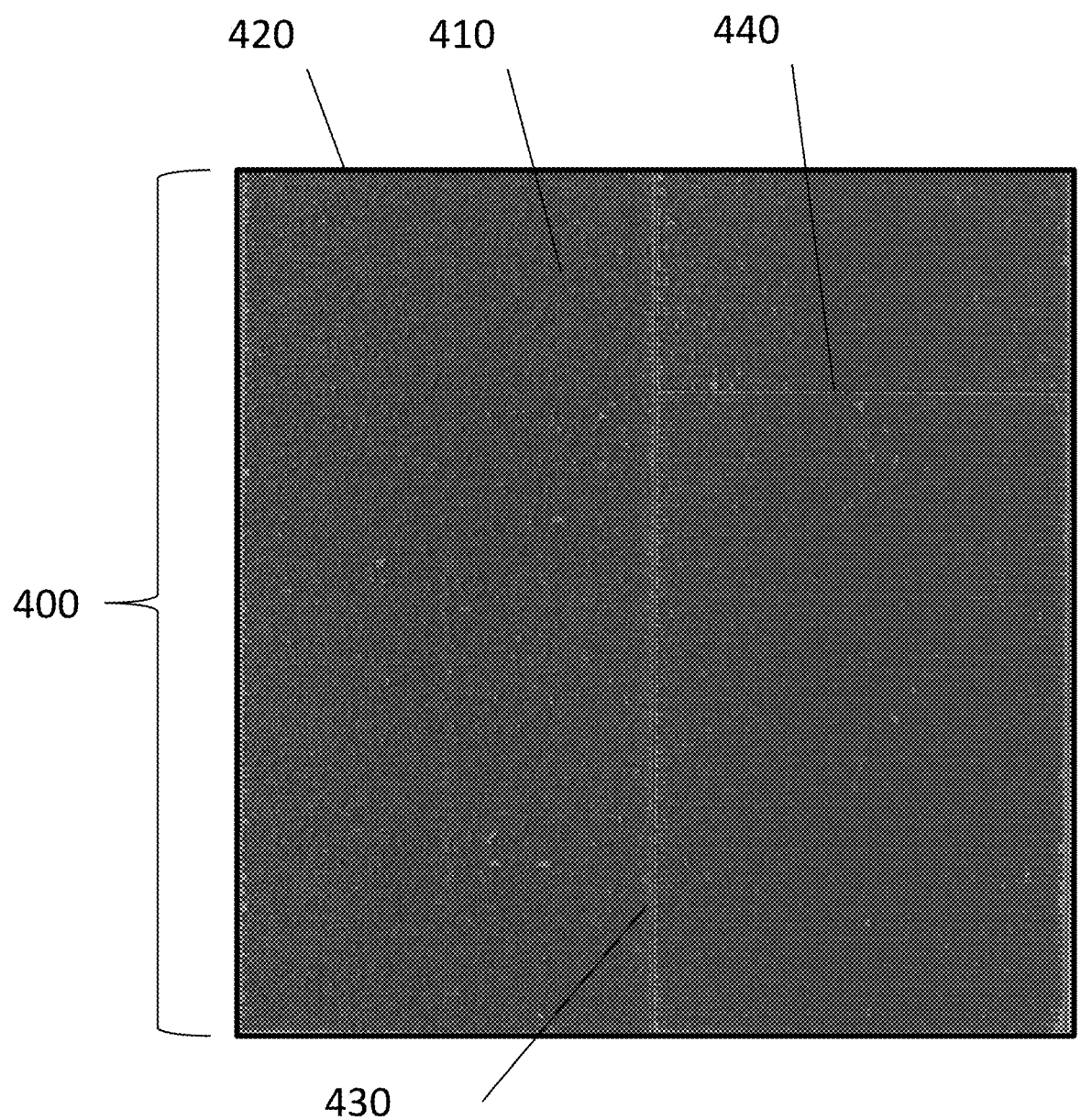
FIG. 4 shows a map of an agricultural block.

FIG. 4 shows a map 400 of a block 410 having a boundary 420. In some embodiments, a block is defined as a geographical area that a grower considers to be one block. In the block 410, rows are defined by trees planted west to east (i.e., left to right in the direction that the map 400 is oriented). The block 410 also includes a road 430 extending in a north-south direction through the center of the block and a service road 440 extending in an east-west direction from the road 430 to the boundary 420. In the block 410, trees have a row span of six meters. Consequently, as described above, if a point (e.g., a location sample from a tractor) is located at the center of a first row, points in adjacent rows may be located by "jumping" at intervals of six meters. However, due to the presence of the service road 440, such "jumping" will not arrive at an appropriate block map.

Figure 5:
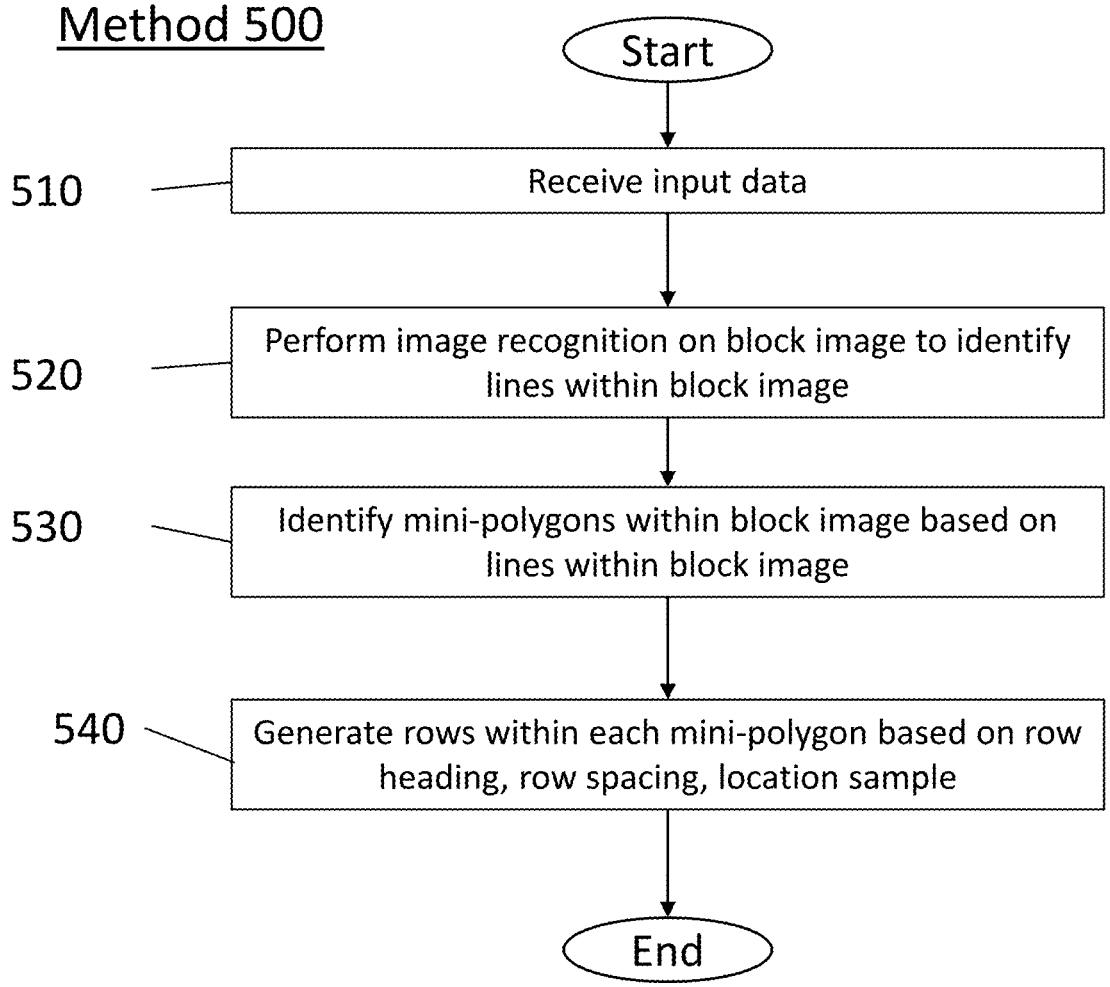
FIG. 5 shows a flowchart of an exemplary method for creating an agricultural block map.

FIG. 5 shows a flowchart of a method 500 for the exemplary technological solution of creating a block map based on the information described above. In some embodiments, the method 500 is implemented by computer-executable code executed by appropriate computer hardware. In step 510, the computer receives input data. In some embodiments, the input data includes (a) row span, (b) tree span, (c) block heading, (d) at least one image of the block, and (e) at least one GPS sample obtained at a location in a row within the block. In some embodiments, the row span is a distance (which may be expressed in, for example, meters, feet, centimeters, or any other appropriate unit). In some embodiments, the tree span is a distance (which may be expressed in, for example, meters, feet, centimeters, or any other appropriate unit). In some embodiments, the block heading is a geographical orientation (e.g., a compass heading, etc.). In some embodiments, the image is a top view image of a block (e.g., the block 410 described above with reference to FIG. 4) encoded in any known image format (e.g., TIFF, JPEG, GIF, etc.). In some embodiments, the image is obtained from open-source satellite data, which is commonly available in the United States. In some embodiments, the image is a photograph obtained through the use of a drone. In some embodiments, the image is obtained through any other suitable means for obtaining a top view image of a block. In some embodiments, the GPS sample is obtained by a tractor having an GPS receiver located within the block. In some embodiments, the GPS sample is obtained using another suitable process. In some embodiments, the GPS sample has an accuracy of less than two meters.

Continuing to refer to FIG. 5, in step 520, as another technological solution, the exemplary method may utilize an image recognition process that is performed on the block image to identify trees and roads. In some embodiments, image recognition may apply a feature extraction algorithm. In some embodiments, the purpose of the feature extraction is to find imperfect instances of objects within a certain class of shapes by a voting procedure. In some embodiments, the feature extraction algorithm uses a Hough transform, which is a method for finding straight lines within an image. In some embodiments, as another technological solution, the image is binarized using thresholding and positive instances are catalogued in an example's data set.

Figure 6:
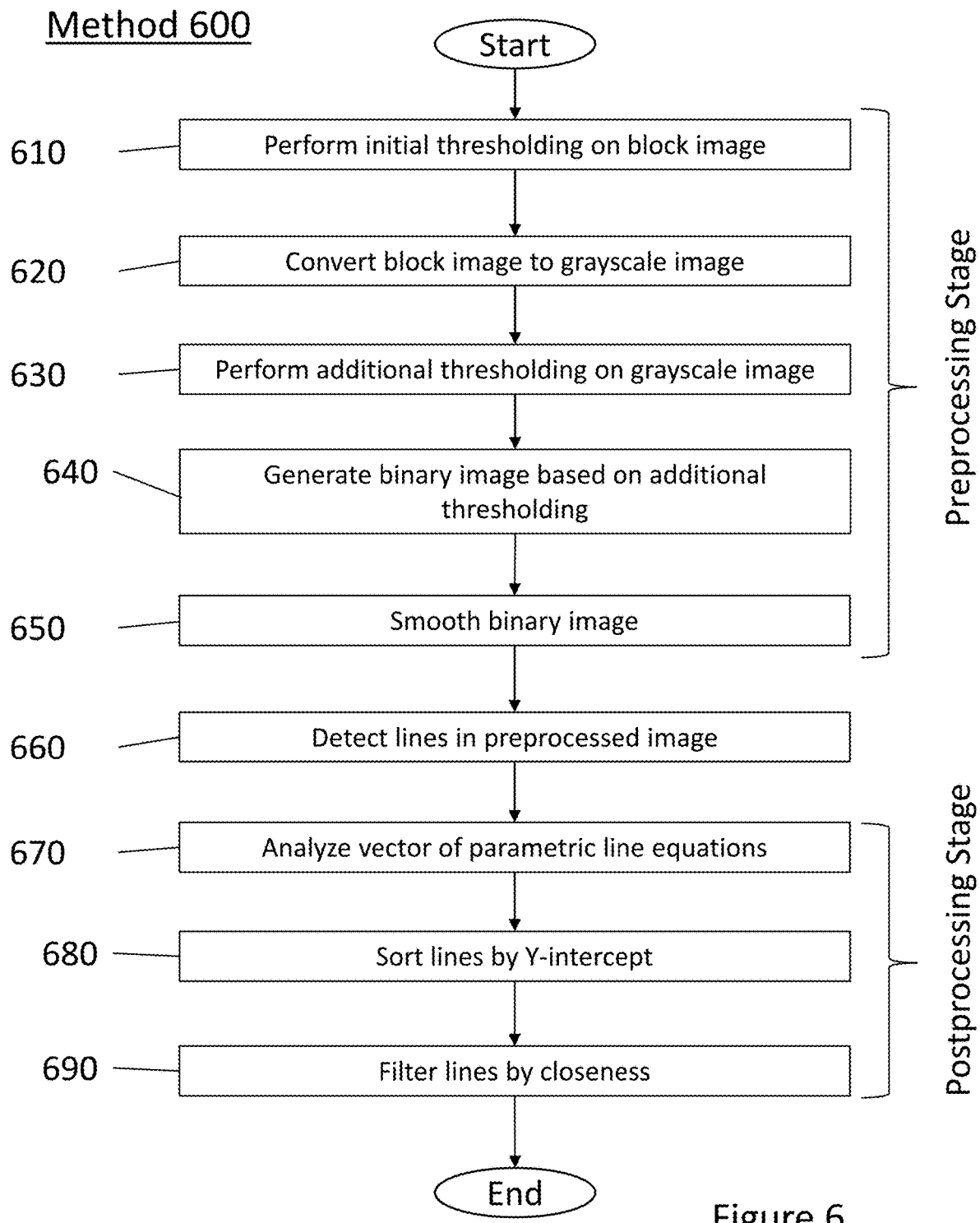
FIG. 6 shows a flowchart of an exemplary method of image processing to detect lines that is utilized during the performance of the exemplary method of FIG. 5.

FIG. 6 shows a flowchart of an exemplary method 600 for the exemplary technological solution of image recognition (e.g., the image recognition of step 520). As described above, image recognition may be performed on an image such as a satellite image of a block. In some embodiments, if necessary, the image may be converted to a suitable image format before performance of the method 600. Referring to the method 600 generally, steps 610 through 650 may be termed a "preprocessing stage" and steps 670 through 690 may be termed a "postprocessing stage."

Continuing to refer to FIG. 6, in step 610, as another technological solution, thresholding is applied to an image. In some embodiments, the threshold value for the thresholding is calculated using Otsu's method. In step 620, the image is converted to a grayscale image using known techniques for converting color images to grayscale images (e.g., averaging, desaturation, decomposition, etc.).

Continuing to refer to FIG. 6, in step 630, as another technological solution, additional thresholding is applied to the grayscale image produced by step 620. In some embodiments, the additional thresholding includes clustering-based thresholding. In some embodiments, the additional thresholding is performed using Otsu's method. In step 640, as another technological solution, a binary image is generated based on the results of the additional thresholding of step 630. In step 650, as another technological solution, the binary image is smoothed. In some embodiments, the smoothing is performed using Gaussian blurring. As noted above, following step 650, the "preprocessing" stage is complete and results in a preprocessed binary image.

Continuing to refer to FIG. 6, in step 660, as another technological solution, lines corresponding to roads are detected in the preprocessed image. In some embodiments, detection is performed using a voting scheme. In some embodiments, only the boldest lines (which correspond to roads) are detected, while other lines (which may correspond to rows) are ignored. In some embodiments, this is accomplished using a morphologic method including steps of dilation, erosion, and dilation. In some embodiments, detection is performed using a Hough transform algorithm.

Following step 660, the "postprocessing" stage begins. In some embodiments, postprocessing may be performed in order to eliminate duplicate lines. For example, in some cases, the Hough transform algorithm may return several parallel lines, each such line spaced a couple of pixels away from the next, and all such lines may correspond to a single wide road; in such cases, postprocessing would eliminate such duplicates. In step 670, as another technological solution, the vectors of the parametric linear line equations are analyzed and grouped. In some embodiments, this step involves identifying the vector (e.g., orientation) of each detected line. In some embodiments, lines having the same heading are grouped with one another. In step 680, as another technological solution, the calculated lines are sorted by Y-intercept (e.g., by their intersection with a defined Y-axis). Accordingly, such lines will be ordered as the closest to the block boundary, the second closest to the block boundary, etc. In step 690, as another technological solution, the lines are filtered by closeness to one another. In some embodiments, all lines from any given group (i.e., lines that have been grouped based on vector in step 670) are reviewed in order of Y-intercept (i.e., as determined in step 680) and all lines that any line that is less than a threshold distance from the prior line is removed so as to provide one line per road. In some embodiments, the threshold distance is the row span.

The result of the method 600 is data defining the positioning of lines within a block (for example, the positions of the road 430 and the service road 440 within the block 410 described above with reference to FIG. 4. It will be apparent to those of skill in the art that the method 600 may also be performed on an image of a block having no roads therein, in which case no lines will be output by the method 600. It will also be apparent to those of skill in the art that in some embodiments, certain steps of the method 600 are omitted. For example, if the source image is a grayscale image, steps 610 and 620 may be omitted.

As noted above, the method 600 may be the image recognition step 520 of method 500. Therefore, the output of the method 600 may be the output of step 520 of the method 500. Referring back to FIG. 5, in step 530, mini-polygons are detected within the large polygon defining the boundaries of a block. In some embodiments, mini-polygons are detected by calculating the intersection of each line output by step 520 with all other lines output by step 520 and within the boundaries of the larger polygon. Each group of intersections surrounding an area of the large block defines a mini-polygon. In one illustrative and non-limiting example, a block may include two roads R1 and R2, each of which has ends A and B, which may be referred to as R1A, R1B, R2A, and R2B. A path is traced by beginning at a vertex of the block polygon and tracing clockwise around the polygon. If the path reaches one of the road endpoints, the path being traced changes direction to follow the road (for example, along road R1 from point R1A toward point R1B, and then continuing in a clockwise direction in the same manner until a closed path has been formed, defining a mini-polygon. The process then continues around the block polygon by returning to the point at which the polygon was originally left (in the example above, at point R1A) and continuing likewise around the block polygon until the original starting point has been reached.

Figure 7:
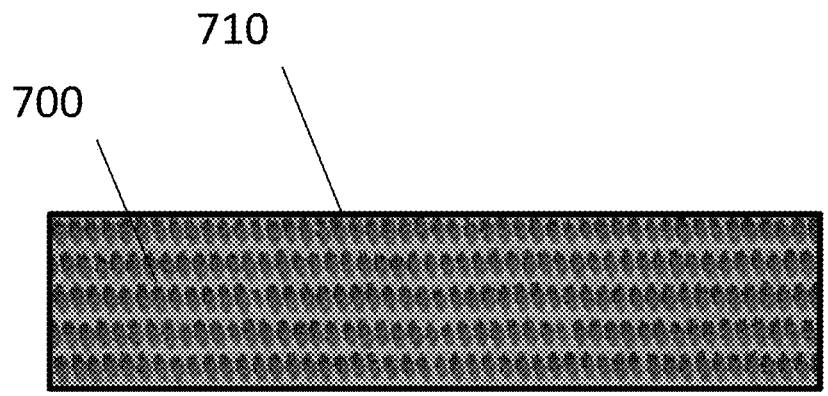
FIG. 7 shows an exemplary polygon generated based on lines detected by the exemplary method shown in FIG. 6.

For example, referring to the block 400 shown in Figure A, the path would begin at the top left corner of block 400, trace clockwise to the top end of line 430, travel along line 430 to the bottom end of line 430, and continue clockwise to the bottom left corner of block 400 and back to the top left corner of block 400. Next, the process would return to the top end of line 430 and trace clockwise to the top right corner of block 400, to the right end of line 440, to the left end of line 440, and back to the top end of line 430. Last, the process would return to the right end of line 440 and trace to the bottom right corner of block 400, to the bottom end of line 430, to the left end of line 440, and back to the right end of line 440. At this point, the entirety of the block 400 has been subdivided into sub-polygons. FIG. 7 shows an example of a mini-polygon 700 that may be generated by step 530. The mini-polygon 700 includes a boundary 710 that may be defined by a combination of the boundaries of a block polygon and lines detected in step 520.

Referring back to FIG. 5, the result of step 530 is a mini-polygon (e.g., the mini-polygon 700 shown in FIG. 7) that contains only trees and rows between trees, and does not include roads (other than at its boundaries). In step 540, geographical lines defining rows within the mini-polygon are generated. In addition to the boundaries of the mini-polygon, step 540 uses as input the row heading, the row span, and a latitude-longitude location sample of a point at a center of a row within the mini-polygon, all of which are inputs received in step 510. During step 540, the latitude-longitude location sample is used as a starting point. From the starting point, a starting line is drawn along the heading in both directions until the boundaries of the mini-polygon are reached. Lines parallel to the starting line are then generated to either side of the starting line, spaced from the starting line by the row span, until the boundaries of the mini-polygon are reached. In some embodiments, step 540 is repeated for each of a plurality of mini-polygons generated by step 530.

In some embodiments, the method 500 also includes step 550, in which, as another technological solution, a tree-level map is generated. In step 550, lines of trees are generated based on the rows identified in step 540 and the tree span. In some embodiments, a line of trees is assumed to exist between each row identified in step 540 and the adjacent rows/mini-polygon boundary. In some embodiments, for each assumed line of trees, a first tree is located at one end of the line adjacent a boundary of the mini-polygon, and subsequent trees are located regularly at intervals equal to the tree span until the opposite end of the mini-polygon is reached.

Figure 8:
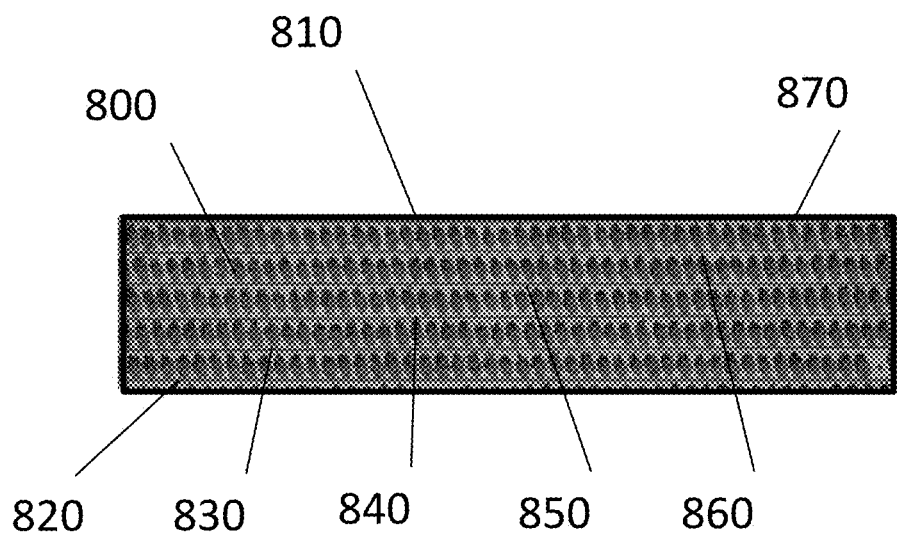
FIG. 8 shows an exemplary block map generated based on the method of FIG. 6.

Following step 540 (or step 550 in embodiments in which this step is included), the method 500 is complete. The result of the method 500 is block maps for one or more mini-blocks within a block. FIG. 8 shows a block map 800 generated based on the mini-polygon 700 shown in FIG. 7. The block map 800 includes a boundary 810 (e.g., as determined by step 530) and rows 820, 830, 840, 850, 860, and 870 (e.g., as determined by step 540).

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A method, comprising:
receiving a tractor speed of a tractor;
comparing the tractor speed to a stop threshold speed;
if the tractor speed does not exceed the stop threshold speed, determining that the tractor is stationary;
if the tractor speed exceeds the stop threshold speed, determining whether the tractor is within a block;
if the tractor is not within the block, determining that the tractor is driving;
if the tractor is within the block, determining whether the tractor speed exceeds an operation threshold speed;
if the tractor speed exceeds the operation threshold speed, determining that the tractor is driving;
if the tractor speed does not exceed the operation threshold speed, determining whether the tractor has a specific action sensor;
if the tractor has a specific action sensor, detecting an activity of the tractor based on the specific action sensor;
if the tractor does not have a specific action sensor, determining whether the tractor has a further sensor;
if the tractor has the further sensor, detecting the activity of the tractor based on the further sensor;
if the tractor does not have the further sensor, determining whether the tractor has an RFID tag;
if the tractor has the RFID tag, determining the tractor activity based on a default activity of the RFID tag; and
if the tractor does not have the RFID tag, determining the tractor activity based on a default activity for the tractor.

2. A method, comprising:
determining whether a tractor is spraying;
if the tractor is not spraying, determining that no spraying error is occurring;
if the tractor is spraying, determining whether the spraying is appropriate for a current weather condition;
if the spraying is not appropriate for the current weather condition, issuing an alert;
if the spraying is appropriate for the current weather conditions, determining whether a current speed of the tractor is within a speed guideline;
if the current speed of the tractor is not within the speed guideline, issuing an alert;
if the current speed of the tractor is within the speed guideline, determining whether a current flow rate of the tractor is within a flow rate guideline;
if the current flow rate of the tractor is not within the flow rate guideline, issuing an alert;
if the current flow rate of the tractor is within the flow rate guideline, determining whether a current location of the tractor is within a block; and
if the current location of the tractor is not within the block, issuing an alert.

3. The method of claim 2, wherein the step of determining whether the tractor is spraying is performed by a method comprising steps of:
receiving a tractor speed of the tractor;
comparing the tractor speed to a stop threshold speed;
if the tractor speed does not exceed the stop threshold speed, determining that the tractor is stationary;
if the tractor speed exceeds the stop threshold speed, determining whether the tractor is within a block;
if the tractor is not within the block, determining that the tractor is driving;
if the tractor is within the block, determining whether the tractor speed exceeds an operation threshold speed;
if the tractor speed exceeds the operation threshold speed, determining that the tractor is driving;
if the tractor speed does not exceed the operation threshold speed, determining whether the tractor has a specific action sensor;
if the tractor has a specific action sensor, detecting an activity of the tractor based on the specific action sensor;
if the tractor does not have a specific action sensor, determining whether the tractor has a further sensor;
if the tractor has the further sensor, detecting the activity of the tractor based on the further sensor;
if the tractor does not have the further sensor, determining whether the tractor has an RFID tag;
if the tractor has the RFID tag, determining the tractor activity based on a default activity of the RFID tag; and
if the tractor does not have the RFID tag, determining the tractor activity based on a default activity for the tractor.

4. A method, comprising:
receiving a current location sample;
determining whether the current location sample is of sufficient quality;
if the current location sample is not of sufficient quality, discarding the current location sample;
if the current location sample is of sufficient quality, determining whether the current location sample is within a same row as at least one prior location sample;
if the current location sample is not within the same row as the at least one prior location sample, discarding the current location sample;
if the current location sample is within the same row as the at least one prior location sample, assigning the current location sample to the same row and generating an updated block map;
determining whether the updated block map includes a potential skipped row;
issuing an alert if the potential skipped row remains a potential skipped row for an amount of time greater than a first threshold;
determining whether the updated block map includes potential adjacent skipped rows;
issuing an alert if the potential adjacent skipped rows remain potential adjacent skipped rows for an amount of time greater than a second threshold;
identifying duplicate spraying within a duplicate spraying row; and
issuing an alert for the duplicate spraying.

5. The method of claim 4, wherein the step of determining whether the current location sample is of sufficient quality comprises comparing a current location sample accuracy to a threshold accuracy, wherein the current location sample is determined to be of sufficient quality if the current location sample accuracy is better than the threshold accuracy, and wherein the current location sample is determined not to be of sufficient quality if the current location sample accuracy is worse than the threshold accuracy.

6. The method of claim 5, wherein the current location sample accuracy is received from a global navigation satellite system receiver.

7. The method of claim 5, wherein the threshold accuracy is three meters.

8. The method of claim 4, wherein a potential skipped row is a row that has not been sprayed and that has rows that have been sprayed to either side thereof.

9. The method of claim 4, wherein the first threshold is one hour.

10. The method of claim 4, wherein the second threshold is between six hours and eighteen hours.

11. The method of claim 4, wherein a duplicate spraying row is a row that has been sprayed by more than one tractor.

* * * * *